N. HOFFMAN, C. L. TRIPLETT & T. D. & W. H. FAWCETT.
SELF CLEANING WEED CUTTER.
APPLICATION FILED MAR. 2, 1914.

1,125,534. Patented Jan. 19, 1915.

3 SHEETS—SHEET 1.

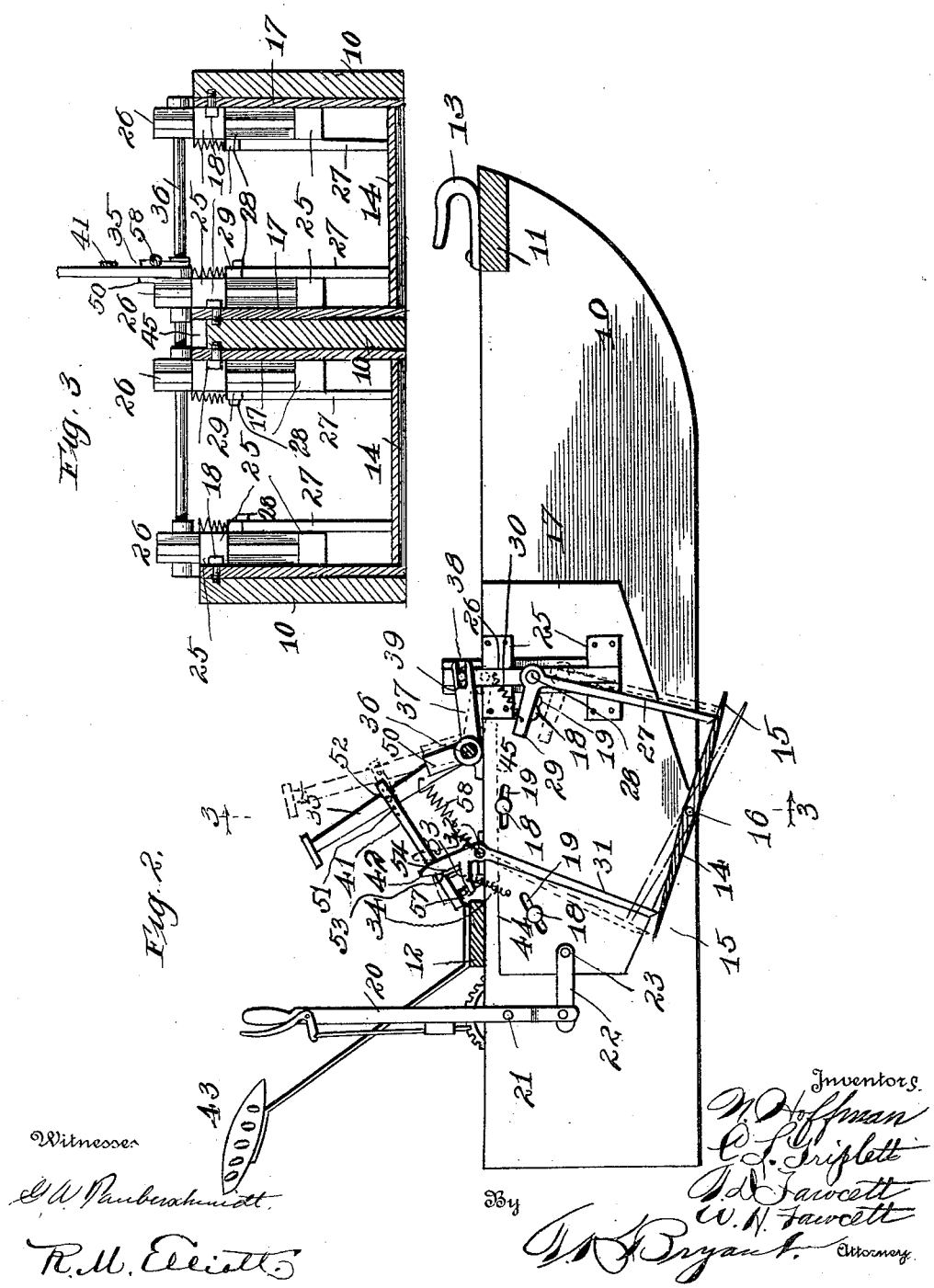

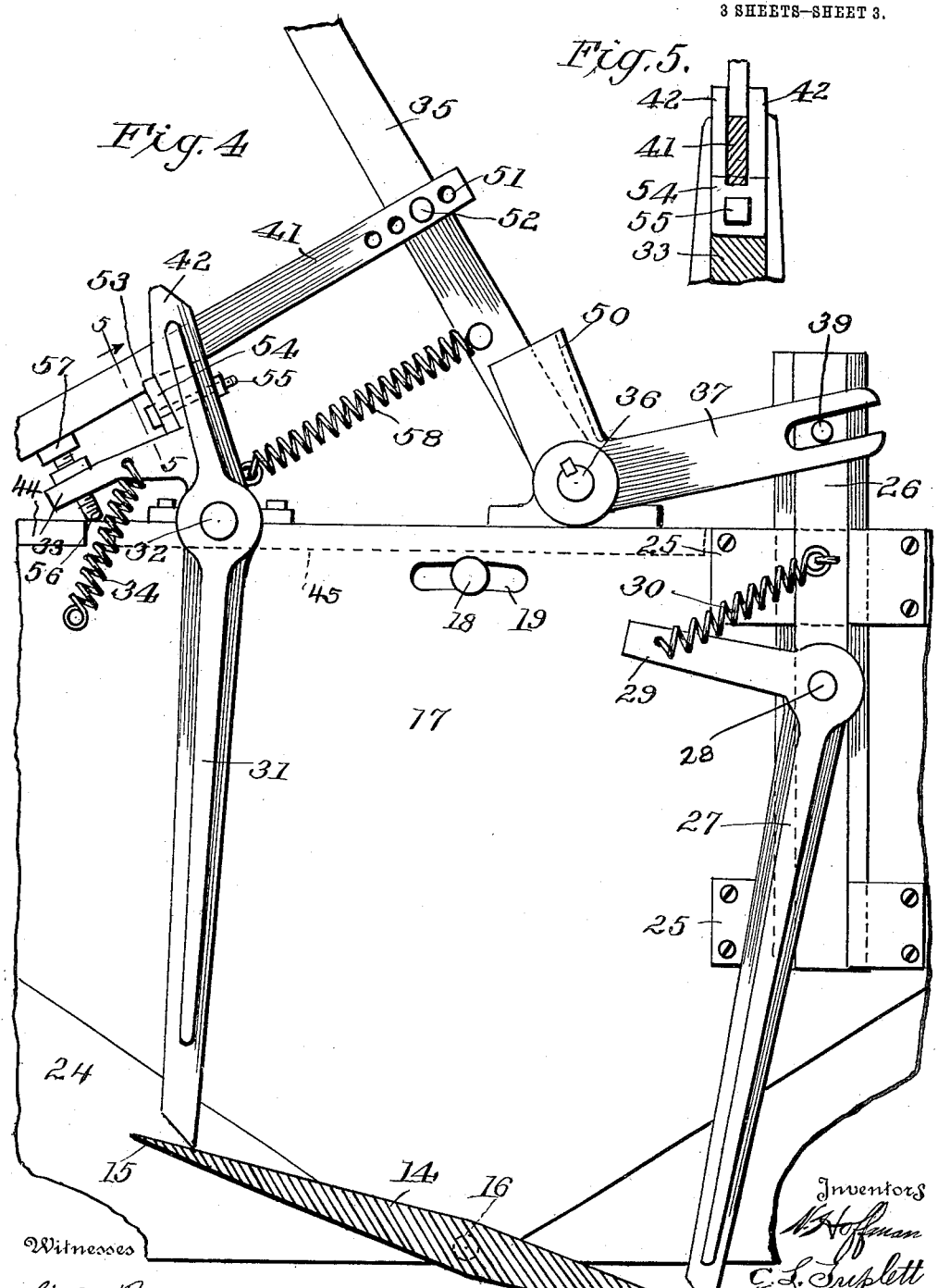

UNITED STATES PATENT OFFICE.

NICK HOFFMAN, CHARLES L. TRIPLETT, THOMAS D. FAWCETT, AND WILLIAM H. FAWCETT, OF POMEROY, WASHINGTON.

SELF-CLEANING WEED-CUTTER.

1,125,534.  Specification of Letters Patent.  Patented Jan. 19, 1915.

Application filed March 2, 1914. Serial No. 821,977.

*To all whom it may concern:*

Be it known that we, NICK HOFFMAN, CHARLES L. TRIPLETT, THOMAS D. FAWCETT, and WILLIAM H. FAWCETT, citizens of the United States of America, residing at Pomeroy, in the county of Garfield and State of Washington, have invented certain new and useful Improvements in Self-Cleaning Weed-Cutters, of which the following is a specification.

This invention relates to improvements in weed cutters and more especially to such devices which are propelled by means of animal or traction engine power.

An object of the invention is the provision of a cutter attachment whereby the blade or blades thereof may be readily cleaned when clogged and one that possesses extreme efficiency in destroying weeds and other vegetable growths.

A further object of the invention is to provide such a device preferably formed entirely of metal and having the cutter blades adjustably mounted positionable at any desired slant for operating at different depths and also reversible for self cleaning.

Another object is the provision of a fast lever means, whereby the rear edges of the blades are initially released to allow the blades to turn and upon a continued movement of the lever the forward blade portions are forced downwardly positively insuring the complete overturning thereof.

It is designed to provide a sled runner form of carriage with plate members which entirely support the operative mechanism and cutting blades which are pivoted between the runners, one or more plates being employed, each bodily movable for positioning the blades and carrying members to be engaged with or disengaged from the blade, all of which features are incident to the objects of the device.

With these general objects in view and others that will appear as the nature of the invention is better understood, the same consists in the novel construction, combination and arrangement of parts hereinafter fully described, illustrated in the accompanying drawings and pointed out in the appended claims.

In the drawings forming a part of this application and in which like reference numerals designate corresponding parts throughout the several views:—Figure 1 is a plan view of the complete device employing two cutting blades and operative mechanism therefor. Fig. 2 is a longitudinal sectional view taken upon line 2—2 of Fig. 1. Fig. 3 is a vertical transverse sectional view upon line 3—3 of Fig. 2. Fig. 4 is an enlarged side elevation of the blade actuating means, the blade being shown in section, and Fig. 5 is a detail sectional view taken upon line 5—5 of Fig. 4.

Referring more in detail to the drawings, a sled member is now illustrated as composed of three runners 10 formed preferably of wood and having a front cross piece 11 and a rearward cross brace 12, the device adapted to be dragged along the ground either by animals or by a tractor which may be connected to the hook 13 positioned upon said front cross piece 11.

Cutting blades 14 being of rectangular form and having sharpened edges 15 are pivoted between the inner faces of adjacent runners 10 by means of the trunnions 16 positioned at the ends of the blades and along the central longitudinal axis and revolubly mounted in openings in the plates 17. One of said plates 17 is positioned upon the adjacent face of each of the runners 10 being adapted for mounting thereon operative mechanism for the blades while the plates are mounted slidably in an arcuate path upon the runners by means of bolt members 18 carried by the runners and projecting through slots 19 in the plates. A shifting lever 20 is pivoted as at 21 to one of the runners 10 and attached by a link 22 to its adjacent plate 17 by the positioning of a bolt 23 carried by the plate and projecting through a perforation of the link. By this means it is apparent that the shifting lever 20 is adapted for slidably moving the plate 17 together with the mechanism hereinafter described which is mounted thereon and together with the intervening blade 14.

Spaced blocks 25 are mounted upon each of the plates having a slide bar 26 movably mounted therein by means of a loose groove and tenon engagement as best illustrated in Fig. 1. A contact arm 27 is pivoted as at 28 to each of the slides 26, such arms being adapted to normally rest in pairs upon the top of the front edge of each cutting blade at the opposite ends, each arm being provided with an angular top extension 29 having a spring connection 30 with the slide whereby this normal position is resiliently maintained. A rear contact arm 31 is secured to the transverse shaft 32 adjacent each rear corner of each blade, which shaft is journaled upon the tops of the plates 17. One of said rear arms 31 is provided with an upper angular extension 33 which is connected by a spring 34 to an adjacent point upon the carrying plate 17 whereby the rear arms are normally positioned upon the top and at the rear edge of the respective cutting blade 14.

A foot lever 35 is journaled upon the shaft 36 which shaft is journaled transversely of the sled to the top edges of each of the plates 17. The rear arms 31 are provided with substantially upright bifurcated ears 42 adapted to slidably receive the rod 41 therebetween. One end of said rod is provided with a plurality of perforations 51 and by means of the bolt 52 is adjustably pivoted to the foot lever 35. This rod is provided with a bottom notch 53 adjacent the free end thereof which is adapted to engage a block 54 rigidly secured to the ears 42 by means of the bolt 55. The angular extension 33 has an adjustable screw 56 mounted therein with the rod 41 normally resting upon the head 57 thereof.

A stub sleeve 50 is keyed to the shaft 36 adjacent to where the foot lever 35 is journaled to the said shaft and is so positioned that the foot lever will have a slight degree of lost motion with respect to said sleeve before engaging the latter upon the forward operative movement of said foot lever. The stub sleeve 50 is provided with an angular extension 37 having an open end slot 38 engaging over a projecting pin 39 upon the adjacent slide 26 whereby it will be evident that a movement of the stub sleeve 50 forwardly will vertically shift the adjacent slide 26 downwardly as well as the arm 27 carried by said slide. The shaft 36 is provided with separate arms 40 similiar to the sleeve arm 37 and all keyed to said shaft adapted for engaging the projecting pins of each of the slides 26. By this arrangement it will be seen that each rotation of the shaft 36 under the impulse of the foot lever operated sleeve 50 manually shifts downwardly each of the slides 26 as well as each of the arms 27 respectively pivoted thereto and engaged with the forward portions of the blades.

When in operation it becomes desirable to turn the cutting blades 14 upon their pivots, the foot lever 35 is actuated by the foot of the driver who is positioned upon the seat 43 whereupon a forward movement being imparted to said foot lever, the same initially results in a forward movement of the rod 41 which by reason of the notched engagement with the block 54 revolves the shaft 32 and thereby moves rearwardly each of the arms 31 thus disengaging the same from the rear edges of the cutting blades 14. The release of these holding members from the rear of the blades, allows the blades by reason of the forward edges projecting into the earth, to revolve one-half of a revolution while the spring members 30 of the forward arms 27 allow the blades to pass thereunder.

The forward movement of the rod 41 carries the arm block 54 therewith, until the engaging screw head 57 raises the rod out of its notched engagement with said block whereupon the spring 34 augmented by the spring 58 positioned between the lever 35 and the base of the ears 42 returns the arms to their normal positions contacting the upper faces of the blades. It will also be seen that the initial movement of the foot lever having disengaged the rear arms from the blades, a further forward movement of the lever effects an engagement thereof with the keyed sleeve 50 and thereby rotates the shaft 36 forcibly depressing the forward arms 27 and sinking the front edges of the blades into the ground thereby insuring an overturning of the same.

The dumping positions of the engaging arms 27 and 31 as well as the operating mechanism are shown in dotted lines in Fig. 2, while the main line position shown therein is the normal position of the elements. The arms 27 and 31 being normally positioned in contact with the pivoted blade and also being carried upon the sliding plate 17, it will be seen that by operating the shifting lever 20 to slide the plate 17 which is linked thereto it will also slide each of the other plates 17 in a similar manner by reason of the fact that the plates are connected together by means of the journaled shafts 32 and 36. Such a movement of the plates 17 with their contact arms in engagement with the respective blades moves the blades a desired distance upon their pivots thus positioning the blades for any depth of cut which may be desired. It is noted that the plates 17 are preferably cut away at their rear upper corners at 44 for allowing clearance with the rear cross member 12 while the tops of the runners 10 are also cut out as at 45 to allow the free movement of the shaft.

The complete operation of the device being apparent from the foregoing detailed description, it is nevertheless to be understood that minor changes may be made in the form, proportion and details of construction without departing from the spirit and scope of the invention, such for instance as the provision of any desired numbers of runners 10 as well as blades positioned between the adjacent runners and it may also be noted that only a single plate 17 need be employed with each blade for operating the same if desired.

What we claim as new is:—

1. A cutter comprising shiftable plates, a double edged blade trunnioned in said plates, pivoted arms having their free ends engaging the upper surface of said blade, shiftable means adapted for initially releasing the rear arms only from said blade.

2. A cutter comprising shiftable plates, a double edged blade trunnioned in said plates, pivoted arms having their free ends engaging the upper surface of said blade, shiftable means adapted for initially releasing the rear arms only from said blade, and further means engageable with said shiftable means during a continued movement thereof adapted for depressing the forward ones of said arms.

3. In a weed cutter, runners, shiftable plates mounted upon said runners, double edged cutting blades revolubly journaled between adjacent ones of said plates, rear arms pivoted to said plates and engaging the tops of said blades, pivoted slidable front arms carried by the plates and engaging above the front portions of the blades, lever mechanism adapted for initially releasing only said rear arms and upon a continued movement thereof adapted for depressing said forward arms.

4. A device of the class described comprising in combination with traction runners, a plate slidably mounted thereon for movement in an arcuate path, a cutting blade, contacting arms carried by said plate and adjustably engaging said blade.

5. A device of the class described comprising the combination with traction runners, a cutting blade pivoted therebetween, a slidable plate mounted upon one of said runners, arms pivoted to said plate adapted for normally contacting said blade and means for moving said arms.

6. A device of the class described comprising in combination with traction runners, a plate mounted upon one of said runners slidably movable in an arcuate path, a cutting blade pivoted between two of said runners through said plate, contact arms pivoted to said plate and engaging said blade, means for shifting said plate and means for moving said arms upon their pivots.

7. A device of the class described comprising the combination with traction runners, of a plate mounted upon one of said runners slidably movable in an arcuate path, means for shifting said plate, a double edged cutting blade pivoted between two of said runners and through said plate, contact arms pivoted to said plate and normally engaging said blade at points adjacent the upper opposite edges thereof and shifting means for said arms carried by said plate.

8. A device of the class described comprising the combination with traction runners, of a plate mounted upon one of said runners slidably movable in an arcuate path, means for shifting said plate, a double edged cutting blade pivoted between two of said runners and upon said plate, a vertically positioned bar slidably mounted upon said plate, a forward contact arm pivoted to said bar, a rear contact arm pivoted to said plate, said arms adapted to normally engage said blade upon the upper surface thereof and adjacent its opposite cutting edges.

9. A device of the class described comprising the combination with traction runners, of a plate mounted upon one of said runners slidably movable in an arcuate path, means for shifting said plate, a double edged cutting blade pivoted between two of said runners to said plate, a vertically positioned bar slidably mounted upon said plate, a forward contact arm pivoted to said bar, a rear contact arm pivoted to said plate, said arms adapted to normally engage said blade upon the upper surface thereof and adjacent its opposite cutting edges, operating means linked to said sliding bar, link connections between said operating means and said rearward contact arm whereby a lowering of the forward arm is effected simultaneously with a disengagement of the rear arm with the blade.

10. A device of the class described comprising in combination with traction runners, a cutting blade pivoted between two adjacent ones of said runners, plates slidably mounted upon said runners for movement in an arcuate path, means carried by said runners for shifting said plate, forward and rearward contact arms pivoted to said plate and adapted for engaging said blade and manually tilting the latter upon a movement of said plate.

11. A device of the class described comprising in combination with traction runners, a cutting blade pivoted between two adjacent ones of said runners, plates slidably mounted upon said runners for movement in an arcuate path, means carried by said runners for shifting said plate, forward and rearward contact arms pivoted to said plate and adapted for engaging said blade and manually tilting the latter upon a movement of said plate, a lever operatively connected with both of said arms and adapted upon forward movement to lower said forward arm and blade edge and simultaneously disengage said rear arm from the blade.

12. A device of the class described comprising runner traction members, plates shiftable in arcuate paths mounted upon said runners, cutting blades pivoted between adjacent runners, contact arms pivoted to said runners in normal engagement with the upper surfaces of said blades, means for shifting said plates simultaneously with the tilting of said blade.

13. A device of the class described comprising runner traction members, plates shiftable in arcuate paths mounted upon said runners, cutting blades pivoted between adjacent runners, contact arms pivoted to said runners in normal engagement with the upper surfaces of said blades, means for shifting said plates simultaneously with the tilting of said blade, journaled rods connecting all of said plates together, and means for simultaneously rotating said rods upon a lowering of the front edges of said blades and a releasing of the rear edges thereof.

In testimony whereof we affix our signatures in presence of two witnesses.

NICK HOFFMAN.
CHARLES L. TRIPLETT.
THOMAS D. FAWCETT.
WILLIAM H. FAWCETT.

Witnesses:
C. ALEX McCABE,
E. V. KUYKENDALL.

Copies of this patent may be obtained for five cents each, by addressing the "Commissioner of Patents, Washington, D. C."